United States Patent [19]

Ashcraft et al.

[11] Patent Number: 5,586,546
[45] Date of Patent: Dec. 24, 1996

[54] FOLD-AWAY GAS APPLIANCE

[75] Inventors: Walter M. Ashcraft, Rockford; Matthew A. Wales, South Beloit, both of Ill.

[73] Assignee: Atwood Industries, Inc., Rockford, Ill.

[21] Appl. No.: 506,366

[22] Filed: Jul. 24, 1995

[51] Int. Cl.⁶ .................................................. F24C 3/12
[52] U.S. Cl. ............................ 126/42; 126/37 B; 126/56
[58] Field of Search ................................. 126/37 B, 56, 126/57, 52, 42

[56] References Cited

U.S. PATENT DOCUMENTS

| | | |
|---|---|---|
| 434,258 | 8/1890 | Edmonds . |
| 724,434 | 4/1903 | Cavanagh . |
| 896,995 | 8/1908 | Kates . |
| 899,600 | 9/1908 | Krabal . |
| 1,000,485 | 8/1911 | Avery . |
| 1,035,208 | 8/1912 | Madden . |
| 1,179,340 | 4/1916 | Smith . |
| 1,372,419 | 3/1921 | Grant .................................. 126/37 B |
| 1,506,145 | 8/1924 | Willis et al. . |
| 2,292,735 | 8/1942 | Besocke ................................. 126/42 |
| 2,314,095 | 3/1943 | Lawrence .............................. 126/42 |
| 2,514,133 | 7/1950 | La Barre et al. ..................... 126/42 |
| 2,578,227 | 12/1951 | Chambers ............................. 126/41 |
| 2,655,142 | 10/1953 | Phares .................................. 126/42 |
| 2,722,592 | 11/1955 | Pellegrin ............................ 126/37 B |
| 2,782,779 | 2/1957 | Chambers ............................. 126/39 |
| 2,882,382 | 4/1959 | Woxman ............................... 219/37 |
| 3,064,554 | 11/1962 | Lamb .................................... 99/337 |
| 3,682,157 | 8/1972 | Perl ................................... 126/37 B |
| 3,692,351 | 9/1972 | Christopher et al. ............... 296/23 R |
| 5,263,467 | 11/1993 | Jones .................................... 126/52 |

FOREIGN PATENT DOCUMENTS 831555  3/1960  United Kingdom ................ 126/37 B

*Primary Examiner*—Carl D. Price
*Attorney, Agent, or Firm*—Leydig, Voit & Mayer, Ltd.

[57] ABSTRACT

A fold-away gas appliance for a recreational vehicle having a sidewall and an opening therein for storing the appliance. The appliance comprises a cooking unit carried on a platform which is disposed for movement between exposed and storage positions. When in the storage position, the platform is substantially flush with the sidewall of the recreational vehicle and, when in the exposed position, the platform extends substantially perpendicular to the sidewall. The cooking unit includes a gas burner in fluid communication with a gas supply through a gas supply line. A cut-off valve disposed in the gas supply line is adapted for movement between open and closed positions to establish and cut off the flow of gas to the burner. An actuator for moving the cut-off valve between open and closed positions is slidably attached to the cooking unit and generally extends between the cooking unit and the opening in the sidewall of the recreational vehicle. The actuator is adapted to move the cut-off valve toward the open position as the cooking unit is moved toward the exposed position, and to move the cut-off valve toward the closed position as the cooking unit is moved toward the storage position.

12 Claims, 4 Drawing Sheets

FOLD-AWAY GAS APPLIANCE

FIELD OF THE ART

The present invention generally relates to gas appliances, and more particularly concerns a gas appliance for use with a recreational vehicle.

BACKGROUND OF THE INVENTION

Recreational vehicles are known and are available in a wide variety of styles, ranging from small camper trailers adapted to be towed behind a towing vehicle, to very large self-propelled automotive camping vehicles offering a wide assortment of amenities. Whether camping in a small trailer or large automotive camper, it is generally desired to have a convenient means of preparing meals. In this regard, stoves, ovens, or other appliances are often provided for use with or as a part of the recreational vehicle. For example, some recreational vehicles provide appliances integrated within a small kitchen area inside the vehicle. Others are known to provide small, portable appliances which may be moved outside the vehicle for outdoor use.

Indeed, and for a variety of reasons, it is often desired to cook outside the camper. It may be desired to cook outside the camper, for example, in order to keep cooking odors outside. Alternatively, it may be desired to cook outside the camper merely to more fully enjoy the outdoors, as opposed to the often cramped confines of the inside camper space. For appliances intended for outside use, there must be provided a convenient storage space for storing such appliances during transport. In order to maximize the usable interior camper space, it is desired to provide an appliance that readily stores on the exterior of the vehicle, and such devices are known.

U.S. Pat. No. 5,263,467 ('467 Patent), for example, discloses a gas grill that is stored within a housing accessible from the outside the vehicle. More specifically, the '467 patent discloses a gas grill that is carried on a multi-segment articulating arm which pivots about spaced vertical axes to allow the grill to extend from the housing to an exposed position outside of the recreational vehicle. In a similar fashion, the articulating arm may be pivoted into the housing for storing the grill therein. A door is hinged to close over the housing and therefore securely stow the grill for transport.

As is known, gas appliances operate by communicating gas from a supply, through a supply line to a gas burner. Typically, when gas appliances are set-up for use, the gas supply line must be connected from the appliance to the gas supply. Once connected, a valve must be opened to permit gas to communicate from the supply to the burner. Alternatively, appliances may be provided and disposed for set up in such a manner that no separate connection between a gas supply and the appliance need be made. In these embodiments, however, it is an important safety consideration that the gas supply valve be closed prior to storage and transport of the appliance.

Again referring to the '467 patent, an automatic means for opening and closing the gas supply valve is disclosed. More specifically, a gas supply valve is rotated into an open position as the articulating arm is pivoted into its outwardly extended position. Conversely, when the arm is pivoted to its retracted or storage position, the gas supply valve is rotated into a closed position, thereby shutting off the gas supply to the burner.

The appliance disclosed in the '467 patent is large and cumbersome and is difficult to store. Even in the most compact version disclosed in that patent, it is necessary to swing the appliance upwardly, to then swing the multi-segment articulated arm inwardly and then to close the hinged door in order to store the appliance.

SUMMARY OF THE INVENTION

The general aim of the present invention is to provide a fold-away gas appliance which effects automatic closure of the gas supply valve as the appliance is stored and which, when compared to prior units of the same general type, is more compact and may be more easily moved from an exposed position to a stored position and vice versa.

A further object of the invention is to provide an appliance which may be stored or exposed simply by swinging the appliance about a generally horizontal axis and which, as an incident to being swung about such axis, automatically closes or opens the gas supply valve.

Still another object is to provide an appliance of the foregoing type in which the opening in the sidewall of the recreational vehicle is automatically closed when the appliance is swung to its stored position.

The invention also resides in using the same mechanism which effects automatic operation of the gas supply valve to hold the cooking unit in its exposed position after the unit has been swung downwardly toward its exposed position.

Additional objects, advantages and other novel features of the invention will be set forth in the detailed description that follows with reference to the accompanying drawings and will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention is generally directed to a fold-away gas appliance for a recreational vehicle. The recreational vehicle includes a sidewall with an opening therein that provides a storage compartment for storing a cooking unit. More specifically, a cooking unit comprising a gas burner attached to a platform is supported by the compartment and is adapted to swing about a generally horizontal axis between exposed and storage positions. In the exposed position, the cooking unit is generally horizontally disposed and substantially perpendicularly extended from the sidewall. When in the storage position, the cooking unit is contained within the storage compartment and the platform is substantially flush with the sidewall to close off the opening in the sidewall of the recreational vehicle.

The cooking unit further includes a cut-off valve associated with the gas burner and movable between open and closed positions to establish and cut-off the flow of gas to the burner. An actuator is included for moving the cut-off valve between the open and closed positions and cooperates with a means fixed relative to the compartment for shifting the actuator in first and second directions relative to the cooking unit. As the cooking unit is swung toward the storage position, the actuator is shifted in the first direction to move the cut-off valve toward the closed position. Similarly, as the cooking unit is swung toward the exposed position, the actuator is shifted in the second direction to move the cut-off valve toward the open position. In this way, movement of the cooking unit between the exposed and storage positions serves to automatically open and close the cut-off valve and, accordingly, to control the supply of gas to the burner.

BRIEF DESCRIPTION OF THE DRAWINGS

The accompanying drawings incorporated in and forming a part of the specification, illustrate several aspects of the present invention, and together with the description serve to explain the principals of the invention. In the drawings.

Reference will now be made in detail to a present preferred embodiment of the invention which is illustrated in the accompanying drawings. While the invention will be described in connection with this embodiment, there is no intent to limit it to that embodiment. On the contrary, the intent is to cover all alternatives, modifications and equivalents included within the spirit and scope of the invention as defined by the appended claims.

DETAILED DESCRIPTION OF THE PREFERRED EMBODIMENT

Figure 1:
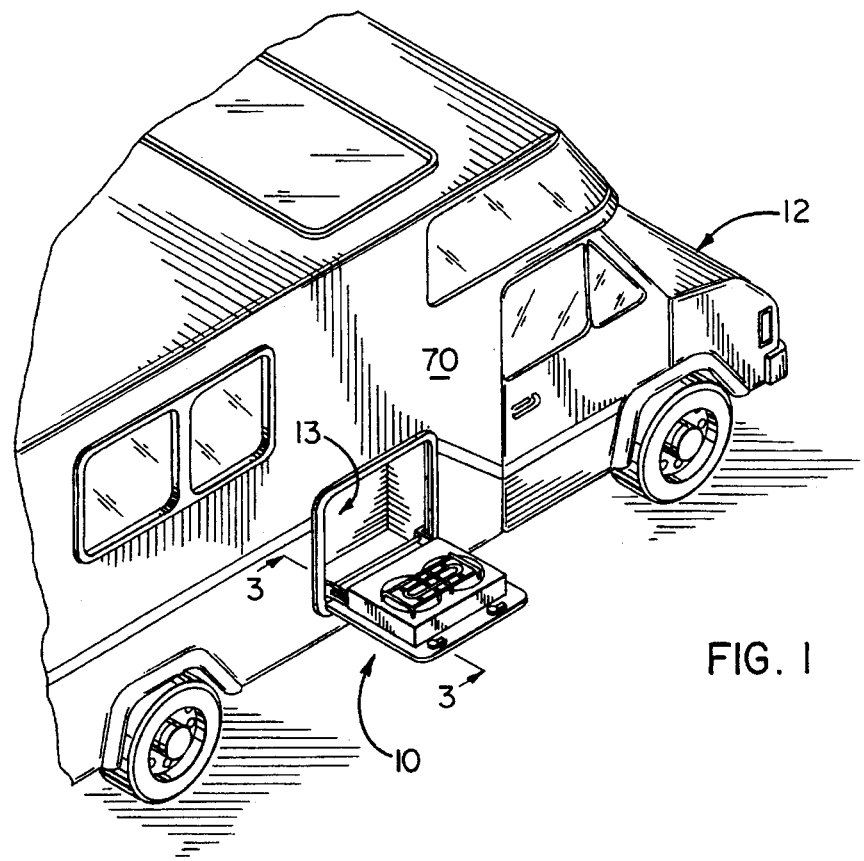
FIG. 1 is a perspective view showing the preferred fold-away gas appliance of the present invention, disposed in its exposed position in a sidewall of an automotive recreational vehicle.
Figure 2:
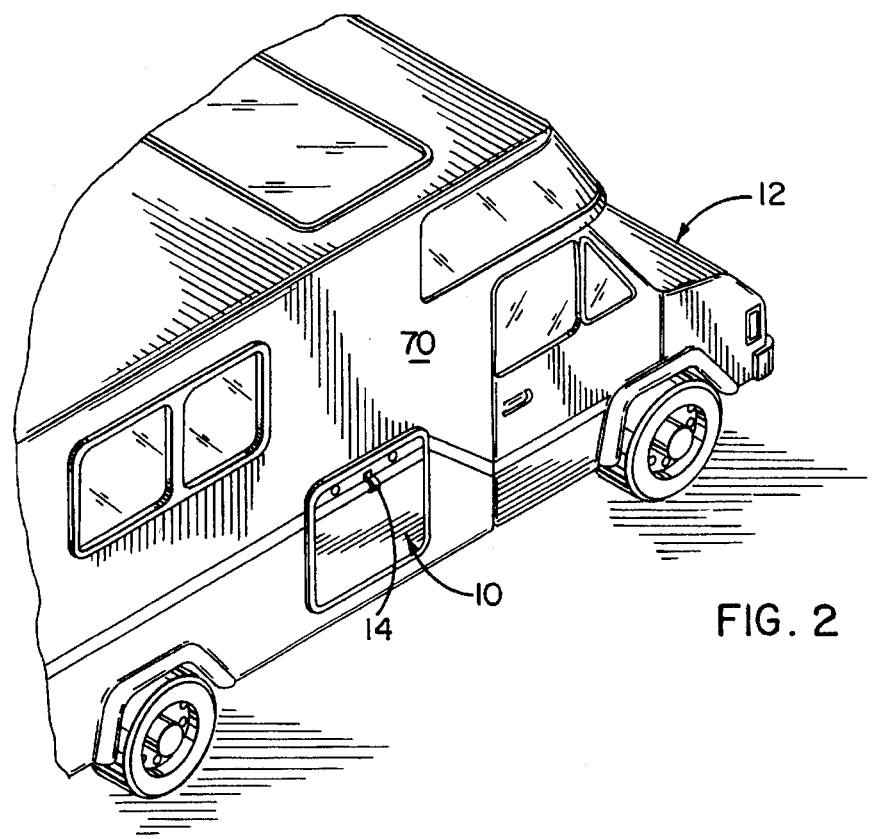
FIG. 2 is a perspective view showing the appliance of FIG. 1 disposed in the storage position.

Referring now to the drawings, FIGS. 1 and 2 illustrate a fold-away gas appliance in an exposed position (FIG. 1) and storage position (FIG. 2). While the appliance, consistent with the concepts and teachings of the present invention, could be a variety of gas appliances, the appliance of the preferred embodiment is a stove, and is generally designated by reference numeral 10. More specifically, a recreational vehicle 12, illustrated as the automotive camper type, is provided with a right sidewall 70 having an opening that defines a compartment for a housing 13 which in turn supports the gas stove 10. The stove 10 is supported on a sidewall 70 of a recreational vehicle and is disposed to swing about a horizontal axis for movement between exposed and storage positions. In the exposed position, the stove 10 is extended from the sidewall in a substantially horizontal orientation. In the storage position, the stove 10 is vertically disposed and contained within the housing 13. Of course, the stove 10 may be disposed in the left sidewall or, alternatively, in the rear wall of the recreational vehicle 12. In addition, the recreational vehicle 12 may be a camper trailer adapted to be towed behind a towing vehicle. The particular environment shown in FIGS. 1 and 2 was chosen merely for illustration and should not be construed to unduly narrow the scope of the appended claims.

Figure 3:
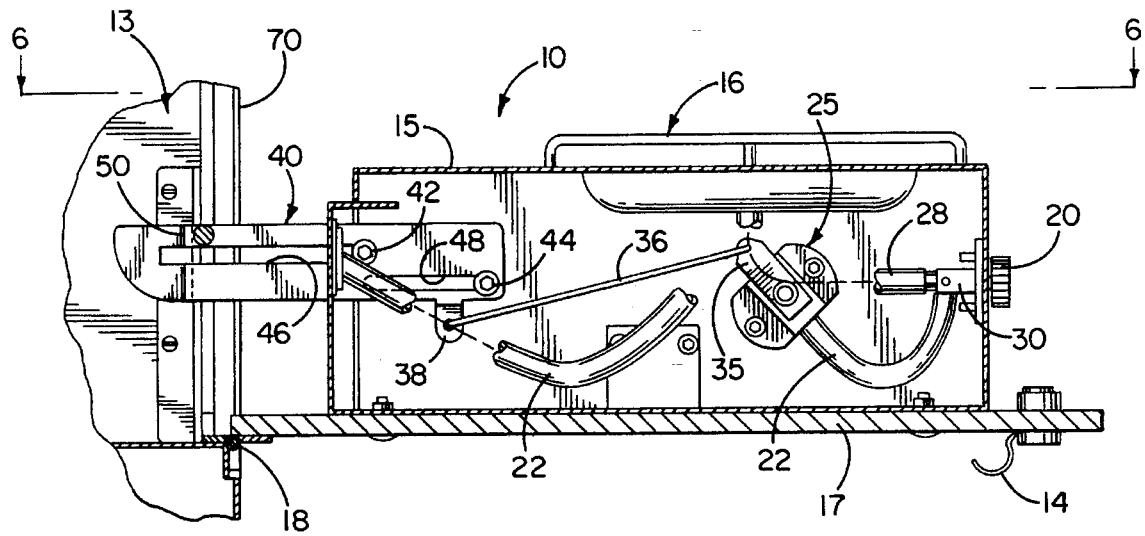
FIG. 3 is a cross-sectional view of the preferred fold-away gas appliance, taken along the line 3—3 of FIG. 1 with the appliance disposed in the exposed position.
Figure 5:
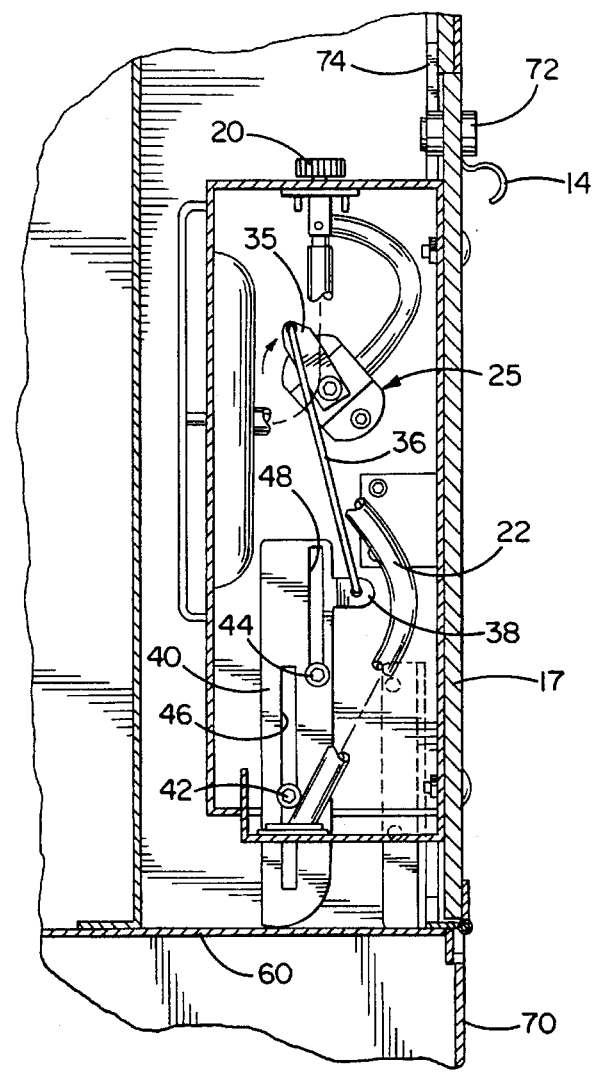
FIG. 5 is another view similar to FIG. 3 but shows the gas appliance disposed in the storage position.

Focusing now on the preferred embodiment of the invention, reference is made to FIG. 3 which shows a cross-sectional side view of the stove 10 as taken along line 3—3 of FIG. 1. The stove 10 more specifically comprises a cooking unit 15 having an upwardly facing gas burner assembly 16 generally supported on a platform 17. The platform 17 is hinged to the housing 13 at 18, as by a piano hinge, for pivotal movement about a horizontal axis between an exposed position and a storage position (FIG. 5). With the cooking unit 15 disposed in its exposed position, outward facing and readily accessible gas control knobs 20 (only one shown in FIG. 3) provide convenient user control of the gas supplied to the individual burners of the burner assembly 16.

As is known, gas stoves of the type disclosed herein are adapted for fluid communication with a gas supply, such as a propane tank (not shown) stored at a convenient and readily accessible location on the recreational vehicle 12. A gas supply line 22, preferably in the form of a flexible tube, connects the gas supply to the burner assembly 16. In order to better illustrate the significant features of the present invention, only segmented portions of the supply line 22 are illustrated in the drawings. It can be appreciated, however, that the supply line 22 is a continuous tubing extending from the burner assembly 16 to a gas supply typically stored in close proximity to the stove 10.

A gas cut-off valve 25 is provided in-line with the supply line 22. As will be understood from the description that follows, the cut-off valve 25 is operative to controllably open and close the supply line 22 for fluid communication of gas from the gas supply to the gas burner assembly 16. The drawings illustrate the exterior of the cut-off valve 25, which includes rocker arm 35 that controls the valve position. In the position shown in FIG. 3, the cut-off valve 25 is in the open position, thereby allowing gas to flow through the supply line 22 to the burner assembly 16 by way of feed tubing 28. As illustrated, the feed tubing 28 is attached to the supply line 22 at a fitting 30 that houses a rotary valve (not shown) controlled by the user control knob 20. Accordingly, a user may rotate knob 20 in order to control movement of the rotary valve within fitting 30 between an open and closed position, in order to control the supply of gas to the burner assembly 16. As is understood, when the control knob 20 is positioned to place the rotary valve in its fully open position, gas will be supplied to the burner assembly 16 at a maximum rate, and therefore achieve the hottest flame. Similarly, when the control knob 20 is rotated to place the rotary valve of the fitting 30 in its fully closed or "OFF" position, the gas flow to burner assembly 16 is cut off and the flame is accordingly extinguished.

Figure 6:
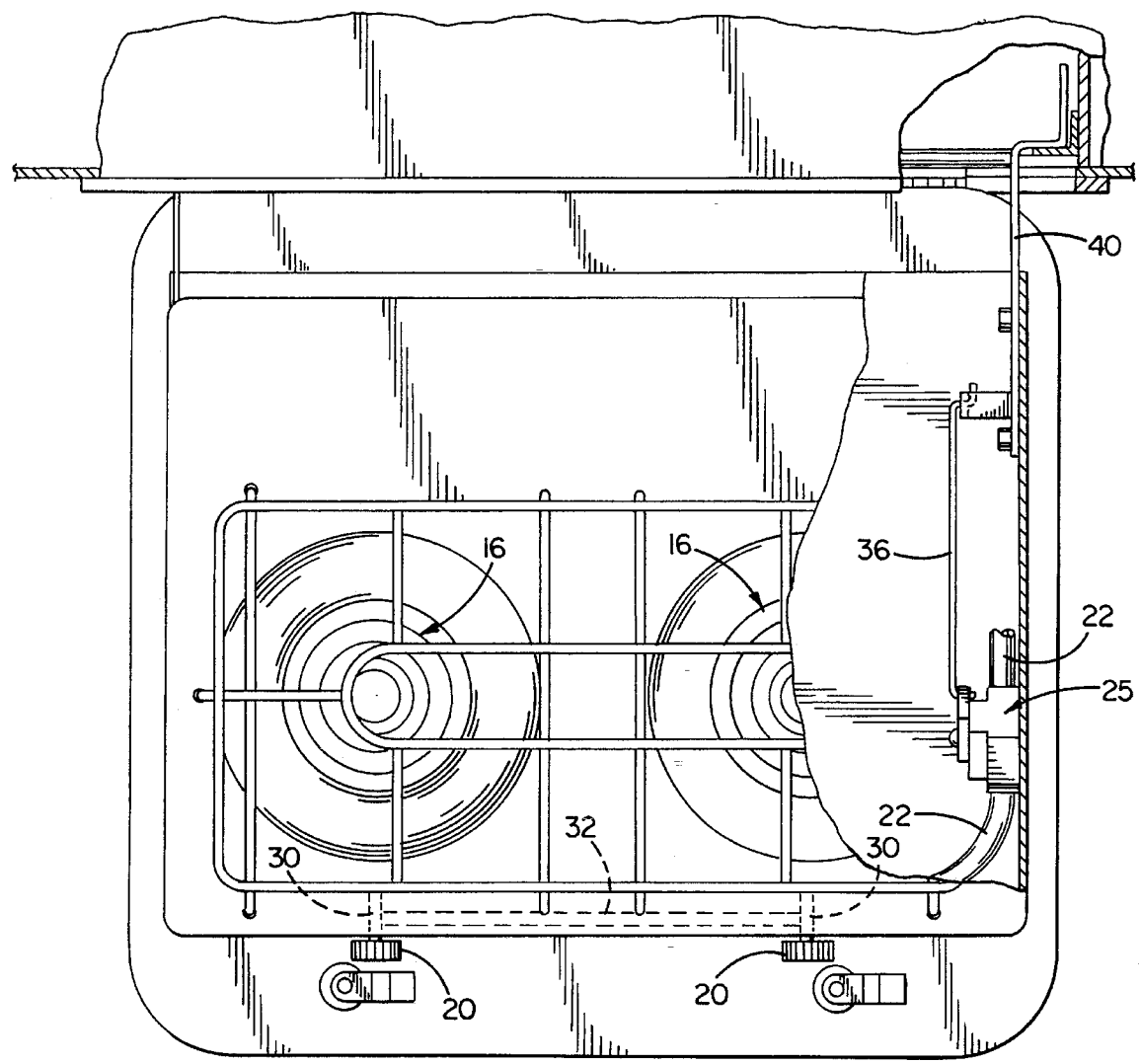
FIG. 6 is a top plan view of the preferred fold-away appliance, with certain parts broken away to show the valve control mechanism of the present invention.

Referring briefly to FIG. 6, the preferred fold-away stove of the present invention includes two burners 16. Accordingly, independent control knobs 20 are provided and associated with each burner 16. An auxiliary supply line 32 (shown in phantom) extends between fittings 30 to provide a path of fluid communication between the supply line 22 and the distant burner 16.

In keeping with the description of FIG. 3, the main cut-off valve 25 is preferably a rotary valve. As previously mentioned, the rocker arm 35 is connected to the internal rotary valve to provide external control of the valve position. A tie-rod 36 extending between the rocker arm 35 and an ear 38 of an actuator bracket 40 is used to move the cut-off valve 25 between open and closed positions. As will be more fully described below, the bracket 40, tie-rod 36 and rocker arm 35 are operative to open the cut-off valve 25 when the cooking unit 15 is in the exposed position (as shown in FIG. 3), and are further operative to close the cut-off valve 25 when the cooking unit 15 is moved to the storage position (shown in FIG. 5).

Figure 7:
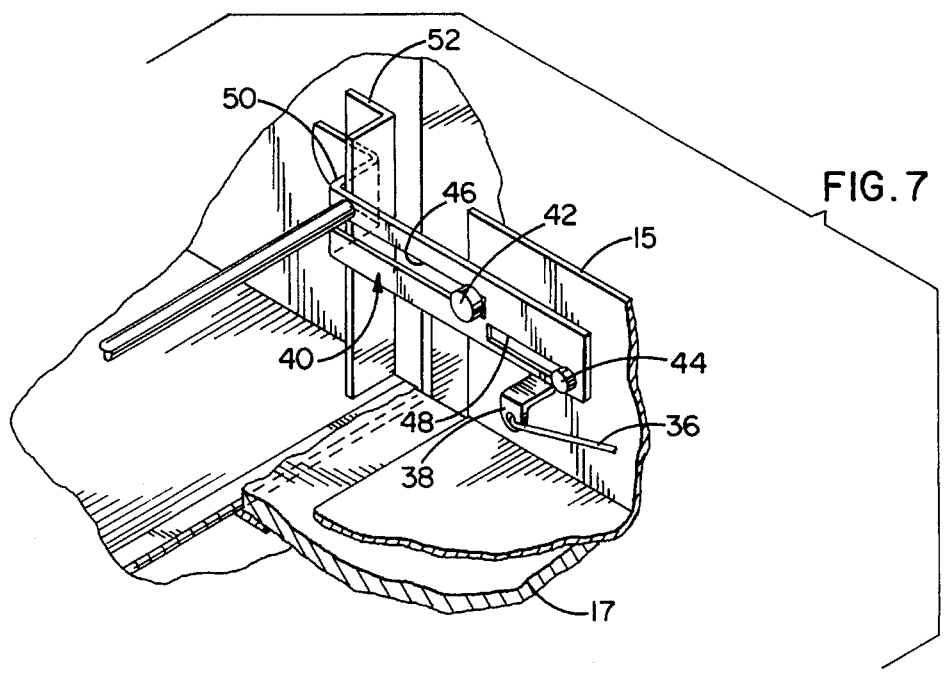
FIG. 7 is a fragmentary perspective view primarily showing the valve control mechanism of the present invention.

To more particularly describe the actuation of the cut-off valve 25, the bracket 40 is slidably attached to the cooking unit 15 by way of guide bolts 42 and 44 and cooperatively disposed guide slots 46 and 48. A catch or lip 50 is also provided in the bracket 40 and cooperates with an upstanding angle iron 52 to provide a stop for the cooking unit 15, the angle iron being attached to the housing 13. The lip 50 abuts the angle iron 52 to support the weight of the cooking unit 15 and to hold the cooking unit in a position substantially perpendicular to the sidewall 70 of the recreational vehicle 12, when in the exposed position (see FIG. 7).

Figure 4:
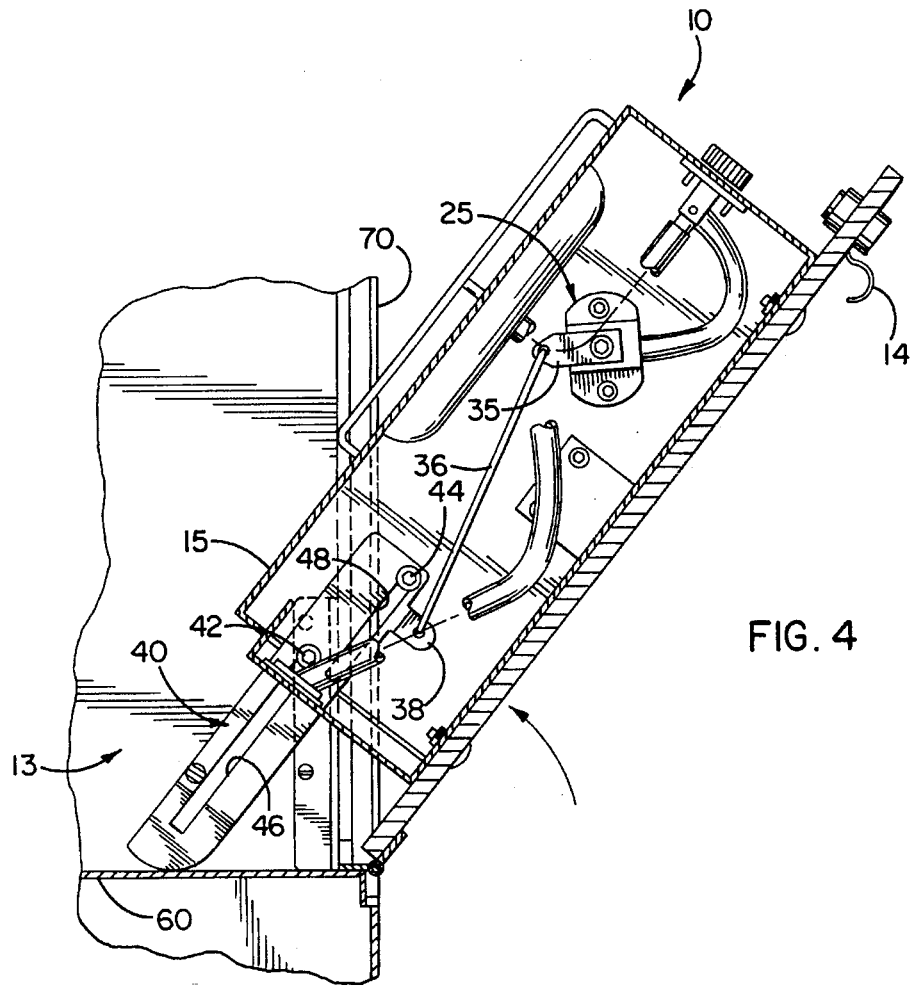
FIG. 4 is a view similar to FIG. 3 but shows the gas appliance disposed in an intermediate position.

When the cooking unit 15 is in the exposed position, the guide bolts 42 and 44 are positioned at the forward end of the guide slots 46 and 48, respectively. As the cooking unit 15 is translated or swung from the exposed position toward the storage position, the bracket 40 is carried by bolts 42 and 44 to swing along with the cooking unit 15, and the lip 50 freely moves away from the angle iron 52 (see FIG. 4 showing the stove assembly 10 in an intermediate position). Indeed, the bracket 40 swings with the cooking unit 15 for a predetermined distance, until the rear or lower end of the bracket 40 abuts a lower wall 60 of the housing 13. After this point, continued movement of the cooking unit 15 toward the storage position shifts the bracket 40 in a first direction (i.e., generally upwardly and forwardly) relative to the cooking unit 15. As the bracket 40 shifts in this first direction, guide bolts 42 and 44 slide generally rearwardly and downwardly within slots 46 and 48. Accordingly, the ear 38 of the bracket 40 moves forwardly in relation to the cooking unit 15, pushing the tie-rod 36 so as to pivot the rocker arm 35 in a direction to close the cut-off valve 25.

As shown in FIG. 5, once the cooking unit 15 has been completely translated to the storage position, the tie-rod 36 has pivoted the rocker arm 35 so as to rotate the cut-off valve 25 to its fully closed position. In this way, the cooking unit 15 is safely guarded against gas leakage which may otherwise occur if either of the control knobs 20 is left in an "ON" position. As shown, when the cooking unit 15 is moved to its storage position, the platform 17 is substantially flush with the sidewall 70 of the recreational vehicle. Keyed locks 72 each having a latching finger 74 positively retain the cooking unit 15 in its storage position for transport.

As is readily appreciated (although not specifically illustrated), the valve mechanism which generally comprises the bracket 40, the tie-rod 36 and the cut-off valve 25 operates in substantially the same way as the cooking unit 15 is moved from its storage position to its exposed position of FIG. 3. That is, as the cooking unit 15 is lowered, the bracket 40 is first carried along with the cooking unit 15. After a predetermined distance and as the cooking unit 15 nears the fully exposed position, the lip 50 of the bracket 40 contacts the angle iron 52. Thereafter, movement of the cooking unit 15 toward the exposed position slides guide bolts 42 and 44 forwardly within guide slots 46 and 48, respectively, causing the bracket 40 to slide in a second, rearward direction with respect to the cooking unit 15. Rearward movement of bracket 40 with respect to the cooking unit 15 acts through the tie-rod 36 to pivot the rocker arm 35 and therefore rotate the cut-off valve 25 toward its open position.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment discussed was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A fold-away gas appliance for a recreational vehicle having a sidewall with an opening therein, the appliance comprising a storage compartment located in the opening, a cooking unit supported by the compartment for pivotal movement to swing downwardly and upwardly between an upright storage position located in the compartment and a generally horizontal exposed position extending outwardly from the sidewall, the cooking unit having a gas burner and having a cut-off valve disposed for operating movement between open and closed positions to establish and cut off the flow of gas to the burner, an actuator operably linking the pivotal movement of the cooking unit with the operating movement of the cut-off valve for moving the valve between the open and closed positions, and bracket means connecting the storage compartment to the cooking unit and linked to the cut-off valve for shifting the actuator in a first direction relative to the cooking unit to move the valve toward the closed position as the cooking unit is swung upwardly toward the storage position and in a second direction relative to the cooking unit to move the valve toward the open position as the cooking unit is swung downwardly toward the exposed position.

2. The fold-away gas appliance as defined in claim 1 wherein said actuator is supported to swing in unison with the cooking unit and is mounted to slide relative to the cooking unit in the first and second directions, the means comprising a first stop for engaging the actuator and causing the actuator to slide relative to the cooking unit in the first direction after the cooking unit has been swung upwardly a predetermined distance toward the storage position, and the means further comprising a second stop for engaging the actuator and causing the actuator to slide in the second direction relative to the cooking unit after the cooking unit has been swung downwardly a predetermined distance toward the exposed position.

3. The fold-away gas appliance as defined in claim 2 wherein the actuator and the second stop include means which engage one another when the cooking unit is in the exposed position to prevent the cooking unit from swinging downwardly about the axis beyond the exposed position.

4. The fold-away gas appliance as defined in claim 3 wherein the compartment includes a bottom wall which defines said first stop.

5. A fold-away gas appliance for a recreational vehicle comprising:

a housing disposed in a sidewall of a recreational vehicle;

a support disposed to carry a gas burner, the support being hinged about a horizontal axis for pivotal movement between exposed and storage positions, the gas burner being extended from the sidewall when the support is moved to the exposed position, the gas burner being located within the housing when the support is moved to the storage position;

a gas supply line extending from a gas supply to the gas burner and adapted for fluid communication therebetween;

a cut-off valve controllably disposed for operating movement between open and closed positions, the cut-off valve being operative to inhibit the flow of gas from the gas supply to the gas burner when in the closed position and to permit the communication of gas from the gas supply to the gas burner when in the open position; and valve control means for controllably moving the cut-off valve between the open and closed positions, the valve control means including a bracket slidably engaging the support as it pivots between exposed and storage positions, and a linkage connecting the bracket to the cut-off valve for linking the pivotal movement of the support with the operating movement of the cut-off valve to open the cut-off valve when the support is moved to the exposed position and to close the cut-off valve when the support is moved to the storage position.

6. A fold-away gas appliance for a recreational vehicle comprising:

a housing disposed in a sidewall of a recreational vehicle;

a support disposed to carry a gas burner, the support being hinged about a horizontal axis for movement between exposed and storage positions, the gas burner being extended from the sidewall when the support is moved to the exposed position, the gas burner being located within the housing when the support is moved to the storage position;

a gas supply line extending from a gas supply to the gas burner and adapted for fluid communication therebetween;

a cut-off valve controllably disposed for movement between open and closed positions, the cut-off valve being operative to inhibit the flow of gas from the gas supply to the gas burner when in the closed position and to permit the communication of gas from the gas supply to the gas burner when in the open position; and valve control means for controllably moving the cut-off valve between the open and closed positions, the valve control means being responsive to the position of the support to open the cut-off valve when the support is moved to the exposed position and to close the cut-off valve when the support is moved to the storage position, the valve control means including a bracket slidably attached to the support and extending between the support and the housing, the bracket being responsive to the position of the support for movement to a first position when the support is moved to the exposed position and to a second position when the support is moved to the storage position.

7. The fold-away gas appliance as defined in claim 6, wherein the valve control means includes a tie-rod extending between the cut-off valve and the bracket, the tie-rod being responsive to the position of the bracket wherein the tie-rod is disposed to move the cut-off valve to the open position in response to movement of the bracket into the first position, the tie-rod further being disposed to move the cut-off valve to the closed position in response to movement of the bracket into the second position.

8. A fold-away gas appliance for a recreational vehicle comprising:

a cooking unit having a gas burner;

a platform carrying said burner, the platform being hingedly supported by a sidewall of a recreational vehicle for pivotal movement between an exposed and a storage position, the platform being substantially perpendicular to the sidewall when in the exposed position and substantially flush with the sidewall when in the storage position;

a gas supply line extending between the gas burner and a gas supply for communicating gas from the gas supply to the gas burner;

a cut-off valve disposed in the gas supply line and adapted for operating movement between an open and a closed position, the cut-off valve inhibiting the passage of gas from the gas supply to the gas burner when in the closed position and permitting the passage of gas from the gas supply to the gas burner when in the open position; and valve control means for moving the cut-off valve between the open and closed positions, the valve control means linking the pivotal movement of the platform with the operating movement of the cut-off valve to automatically close the cut-off valve when the platform is moved to the storage position and to automatically open the cut-off valve when the platform is moved to the exposed position, the valve control means including a bracket that slidably engages the cooking unit and extends between the sidewall and the platform and is disposed for movement between a first and second position.

9. The fold-away gas appliance as defined in claim 8, wherein the bracket is responsive to the position of the cooking unit for movement to the first position when the cooking unit is moved to the exposed position and to the second position when the cooking unit is moved to the storage position.

10. The fold-away gas appliance as defined in claim 9, wherein the valve control means further includes a tie-rod extending between the cut-off valve and the bracket, the tie-rod being responsive to the position of the bracket and disposed to move the cut-off valve to the open position in response to movement of the bracket into the first position, the tie-rod being further disposed to move the cut-off valve to the closed position in response to movement of the bracket into the second position.

11. The fold-away gas appliance as defined in claim 8, wherein the platform carries first and second gas burners.

12. The fold-away gas appliance as defined in claim 8, wherein the recreational vehicle is a camper trailer.

* * * * *